Oct. 7, 1969   R. M. GAGE   3,471,674
GAS FLOW CONTROL APPARATUS
Filed Jan. 20, 1966
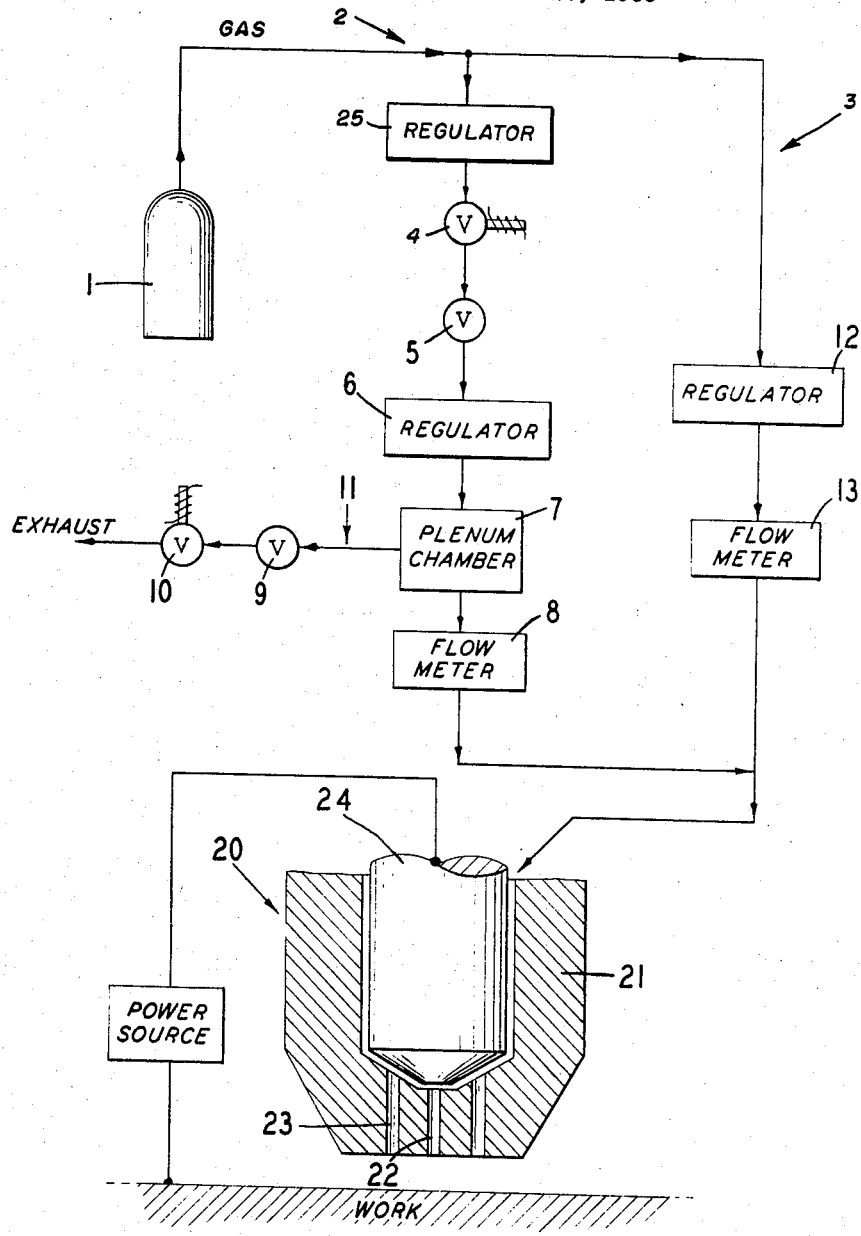
INVENTOR.
ROBERT M. GAGE
BY
ATTORNEY

United States Patent Office 3,471,674
Patented Oct. 7, 1969

3,471,674
GAS FLOW CONTROL APPARATUS
Robert M. Gage, Summit, N.J., assignor to Union Carbide Corporation, a corporation of New York
Filed Jan. 20, 1966, Ser. No. 521,878
Int. Cl. B23k 9/16
U.S. Cl. 219—74                                                       6 Claims

ABSTRACT OF THE DISCLOSURE

A gas flow control apparatus particularly adaptable for use with a plasma arc welding torch provides for an effectively linear up-and-down sloping of shielding gas at the beginning and end of an arc weld. Two gas pressure regulators with a throttle and a shut-off valve located therebetween are connected in a main gas line between a source of gas and a plenum chamber. The first regulator provides a steady state pressure to the throttle valve and the second regulator operates in conjunction with the first to provide a rapid and effectively constant pressure build up in the chamber. The chamber is connected to the torch and operates in conjunction with the pressure regulators and the throttle valve to control the rate of build up of gas flow to the torch. The plenum chamber also includes an exhaust line with a throttle valve and a shut-off valve for regulating the decay of gas to the torch. An additional gas line is connected in parallel with the main gas line and includes a pressure regulator and a flow meter to provide a low volumetric flow of gas to the torch.

---

This invention relates to a simplified apparatus for providing a controlled rate of change in gas flow from a first flow rate to a second flow rate, and in particular, to such apparatus for use in plasma arc welding.

In recent years a new welding process has been developed. This process is known as plasma arc welding and is distinguished by a high energy density arc effluent containing a stream of hot gas commonly referred to as "plasma." One of the advantages of this process is that the controlled force of the arc effluent penetrates the work to be welded in such a manner that more consistent weld penetration is obtained as compared with, for example, tungsten inert gas welding. More consistent penetration is obtained because it is possible to obtain an easily controlled "keyhole" effect with a plasma arc. Keyholing describes a technique of penetrating or piercing the workpiece with the arc effluent to produce a hole through the work and then moving the hole produced by the arc effluent along the line of weld while allowing the molten metal to flow around the arc effluent and unite behind such effluent to form a weld. Stated differently, the term "keyholing" is here applied to a technique whereby the welding operating parameters such as the arc constricting nozzle, current, gas flow rate, and the relative speed between the arc and the workpiece, are adjusted to produce a plasma jet forceful enough to penetrate completely through the workpiece but not strong enough to expel molten metal from the joint as in plasma arc cutting. As the weld progresses, base metal is melted ahead of the keyhole and surface tension causes it to flow in behind the keyhole to form the weld bead.

The keyhole technique is used in plasma arc welding in, for example, the square butt joint welding of materials such as brass, copper, steels, stainless steels, copper-nickel alloys, titanium and zirconium among other materials, generally in the thickness range of 0.020 to ½ in. Keyholing can also be used for welding V or U groove joints, for example, on thicker materials provided the root face dimension falls approximately within the aforementioned limits.

One of the shortcomings of the keyhole technique is that at the end of the weld a hole remains in the workpiece, thus wasting that portion of the workpiece which contains the hole. Another problem occurs when starting the weld. On material thicknesses greater than ⅛ in., the result of piercing the workpiece at the commencement of the weld is formation of a keyhole larger than the width of the normal weld bead with excessive penetration at the starting spot. This occurrence is normally not acceptable.

In addition, when using the plasma arc keyholing technique for welding circumferential joints which must be overlapped and tied-in, the manner in which the keyhole is established at the start of the weld and closed at its end becomes a critical problem. The surface of the weld at its start must be smooth so that it can be overlapped properly. At the end of the weld the keyhole must be closed and the weld crater eliminated.

In copending application, Ser. No. 369,060, filed May 21, 1964, H. R. Miller describes a method for achieving keyholing in plasma arc welding. The present invention is directed to apparatus ideally suited for practicing the method described by H. R. Miller. Up until now, typical apparatus used for practicing the Miller invention contained either a variable volume plenum chamber with appropriate valving, flowmeter, and piping to taper gas flow rate, or a mechanically varied valve in the flow line.

With the equipment herein described, reproducible control of rate of change in gas flow rate as achieved without the use of continuously moving parts requiring either carefully controlled movement or precise adjustment. Upslope and downslope are possible with apparatus comprised of relatively simple, rugged, conventional components.

It is an object of this invention to provide a simplified apparatus by which the flow of gas can be easily controlled for establishing a keyhole and effecting the closure of the keyhole at the end of a weld.

It is another object of this invention to provide a gas flow control apparatus for plasma arc keyholing which is capable of effecting satisfactory overlapping and tieing-in of a weld with a previously deposited weld bead.

These and other objects, advantages, and features of this invention will become apparent from the following description, appended claims and drawings in which:

The sole figure is a schematic depiction of the apparatus of the present invention.

Briefly, the invention comprises a gas line connecting in flow relationship a source of gas with a point of use. One gas pressure regulator is provided in the line for establishing a steady state pressure to a throttle valve. Another gas pressure regulator is provided in the line for establishing in conjunction with the pressure set by the first mentioned regulator, a rapid and effectively constant rate of buildup of pressure in a chamber to a preselected final pressure which it thereafter maintains until the flow rate is reduced or terminated. Means are connected in the line downstream of the chamber to provide a controlled flow from the chamber to the point of use.

A preferred embodiment of this invention is illustrated schematically in the figure, which shows a system for providing control of the gas flow. A gas source 1 of, for example, argon is connected in flow relationship to high volumetric flow line 2 usually of ¼ in. minimum diameter tubing, and low volumetric flow line 3. Connected in series in line 2 are gas regulator 25, solenoid valve 4, throttle valve 5 and regulator 6. A characteristic of the regulators used, in common with virtually all gas pressure regulators, is that they are essentially wide open to flow until the downstream pressure reaches the preselected final value. The solenoid valve 4 operates to open or close line 2 to gas flow, the occurrence of which will be subsequently described. Throttle valve 5 is provided to control the rate of gas flow to regulator 6 and, thus, the rate of pressure buildup in plenum chamber 7. Regulator 6 is set to establish the desired final steady state pressure in plenum chamber 7. Flowmeter 8, which includes a needle valve, is adjusted to give the desired final maximum steady state flow rate at steady state chamber pressure. Regulator 25 and throttle valve 5 are adjusted to yield the desired predetermined time interval between zero and the steady state flow rate. Pressure at regulator 25 can be selected to achieve (or approach) a critical pressure drop across throttle valve 5, during pressure buildup, thereby providing a nearly constant mass flow rate of gas into the plenum chamber until the plenum pressure reaches the preset pressure at regulator 6. With constant mass input, the pressure rise will be almost linear since the flow rate through valve 5 into the chamber will usually greatly exceed the flow rate through flowmeter 8 of the chamber.

Connected in series in exhaust line 11 are throttle valve 9 and solenoid valve 10. The solenoid valve 10 is either open or closed and determines whether gas flows in the exhaust line 11. In the preferred embodiment an adjustable valve 9 is provided which determines the rate of gas discharge from, and pressure reduction in, plenum chamber 7 when solenoid valve 10 is open and solenoid valve 4 is closed. Downslope time is established by adjusting throttle valve 9. Downsloping is initiated by closing valve 4 and opening valve 10.

The low volumetric gas flow line 3 is connected in series to regulator 12 and flowmeter 13. The regulator 12 operates to establish the desired gas pressure at flowmeter 13. The flowmeter 13 determines the volumetric flow rate of the gas flowing in line 3. In the embodiment shown, the apparatus of the invention is connected to a plasma arc torch.

The plasma arc torch 20 basically consists of a nonconsumable electrode 24 aligned with and adjacent to one end of a nozzle 21. The nozzle has a constricting center passage 22 through which the arc passes together with the arc gas. Preferably, the torch 20 is provided with a nozzle that has additional gas orifices 23 on either side of the center passage 22 in the nozzle. These orifices straddle the line of weld and help shape the arc. The torch receives its power from the power source as indicated. Pilot arc circuits have been omitted from the diagram for simuplicity.

The position of the gas regulator 6 in the circuit is preferably upstream of the plenum chamber. With the regulator in this position the gas flow to the torch promptly reaches the final value in an essentially linear manner. An additional benefit of this placement of the regulator is that the downslope of gas flow to the torch begins simultaneously with the discharge of gas from the chamber without a delay associated with reducing chamber pressure to the regulator pressure.

The volume of the plenum chamber is also an important feature of this invention. While the length of time required to build up or decay gas flow rate is controlled by the suitable selection of gas pressures and throttle valve settings for a fixed volume plenum chamber, the chamber volume in turn dictates the throttle valve setting and the linearity of gas flow upslope for a given final equilibrium flow rate to the torch.

An effectively linear upslope requires the flow rate into the plenum chamber to be significantly larger than the flow rate from the chamber to the torch. During periods of gas flow sloping this relationship establishes the minimum size of the plenum. On the other hand, attainment of a sufficiently rapid up or downslope time in the order of a second for plasma arc welding, for example, establishes the maximum plenum volume if practical size throttle valve and discharge lines are to be employed. For the purposes of this invention, relating to plasma arc keyhole welding, a plenum chamber volume of 0.05 to 0.2 cu. ft. is satisfactory and convenient. For example, a typical gas slope device used for keyhole welding will have an adjustable upslope time of from 1 to 10 seconds. During this time (up to 10 seconds) the gas output from the plenum to the torch must increase to as much as 25 c.f.h. The gas input to the plenum feeding the torch must always appreciably exceed this flow rate during the period of gas sloping so that the final plenum pressure and steady state flow rate is promptly achieved. The flow into the plenum at one second rise time must be up to ten times greater than at 10 seconds rise time. Also, for the simplest and most practical installations in existing plant gas supply systems, the maximum flow rate into the plenum must be minimized so as not to lower the supply line pressure excessively.

Combining these requirements, a typical system can be specified:

Minimum input rate to plenum chamber (for 10 sec. rise to 25 c.f.h. output) _____c.f.h__ 35
Maximum input rate to plenum chamber (for 1 sec. rise) _____c.f.h__ 240
Total net input _____cu. ft. s.t.p__ 0.06
Final plenum pressure _____p.s.i.g__ 20
Volume of plenum _____cu. ft__ 0.05

It should be noted that the upslope for 10 second rise time has a final net in flow rate about 30 percent of its initial value since the effluent rate from the plenum is appreciable relative to the flow into the plenum, i.e., 25 vs. 35 c.f.h. s.t.p. This departure from true linearity is as large as should be designed into the system. Increasing the plenum size to 0.2 cu. ft. results in an approximately linear 10 seconds upslope at an input rate of 130 c.f.h. s.t.p. The flow rate required with this plenum volume for a one second upslope time is about 1000 c.f.h. s.t.p.

In operation, an arc is established between the torch electrode 24 and the workpiece (work) at a starting current and gas flow. Relative motion between the workpiece and the torch is provided. The current and gas flow are gradually increased from these starting values up to welding current and welding gas flow, which effects keyhole welding, over a time interval such that the transition from no keyhole to keyhole welding is smooth and gradual. When terminating the weld, the current and gas flow are gradually reduced over a time interval such that the transition from keyhole to no keyhole welding is smooth and gradual.

The above description of the preferred embodiments of this invention should not be construed as limiting the invention to the specific items discussed. Obvious modifications can be made without departing from the spirit and scope of the appended claims. For example, the solenoid valve 4 and the needle valve 5 could be combined into one unit and regulators 12 and 25 can be replaced with a single regulator. Moreover, it should be understood that the system described can be operated manually or automatically. Extension of the invention to other applications is also intended. For example, the advantages in spot welding are self-evident.

What is claimed is:

1. Apparatus for providing effectively constant rate of change in gas flow from a first flow rate to a second flow rate over a predetermined time period comprising a first gas line communicating a source of gas with a point of use; a plenum chamber in said gas line for receiving gas from said source; a regulator means in said line upstream of said plenum chamber for establishing steady state pressure in said chamber; a second regulator means in said line upstream of said plenum chamber for establishing, in conjunction with the pressure set by said first regulator means, an effectively constant rate of buildup of pressure in the plenum chamber to a predetermined steady state pressure; first valve means for controlling the steady state flow from said chamber to the point of use; and a second valve means in said line between said regulators for controlling gas flow rate from the source to the chamber.

2. Apparatus according to claim 1 wherein the plenum chamber has a volume in the range of from 0.05 to about 0.2 cu. ft.

3. Apparatus according to claim 1 including a second gas line of lower volumetric gas flow than said first gas line having a regulator and a flowmeter connected in series therein, said second gas line being in parallel relationship with said first gas line.

4. Apparatus according to claim 1 wherein the point of use includes an arc welding torch having an electrode extending into a nozzle for receiving gas from said chamber.

5. Apparatus according to claim 1 wherein a valve means is connected in gas flow relationship between the plenum chamber and the point of use for determining the rate of gas discharged from said plenum chamber.

6. Apparatus according to claim 1 wherein a valve means is connected in gas flow relationship between the plenum chamber and the atmosphere for controlling the decay of pressure in said chamber.

References Cited

UNITED STATES PATENTS

| | | | |
|---|---|---|---|
| 2,439,458 | 4/1948 | Eaton | 137—624.14 X |
| 2,462,614 | 2/1949 | De Witt | 137—624.14 X |
| 3,211,179 | 10/1965 | Lilly et al. | 137—624.14 |

FOREIGN PATENTS 3,922,122  10/1964  Japan.

JOSEPH V. TRUHE, Primary Examiner

J. G. SMITH, Assistant Examiner

U.S. Cl. X.R.

137—599